(12) United States Patent
Fürlinger

(10) Patent No.: US 12,116,124 B2
(45) Date of Patent: Oct. 15, 2024

(54) AIRCRAFT AND FOLDING WING SYSTEM

(71) Applicant: VOLARE GmbH, Mödling (AT)

(72) Inventor: Andreas Fürlinger, Vienna (AT)

(73) Assignee: VOLARE GmbH, Mödling (AT)

( * ) Notice: Subject to any disclaimer, the term of this patent is extended or adjusted under 35 U.S.C. 154(b) by 0 days.

(21) Appl. No.: 17/766,413

(22) PCT Filed: Sep. 4, 2020

(86) PCT No.: PCT/EP2020/074774
§ 371 (c)(1),
(2) Date: Apr. 4, 2022

(87) PCT Pub. No.: WO2021/069156
PCT Pub. Date: Apr. 15, 2021

(65) Prior Publication Data
US 2024/0308644 A1    Sep. 19, 2024

(30) Foreign Application Priority Data
Oct. 8, 2019   (EP) .................................... 19201846

(51) Int. Cl.
*B64C 3/56*     (2006.01)
*B64C 29/00*    (2006.01)

(52) U.S. Cl.
CPC ............ *B64C 3/56* (2013.01); *B64C 29/0008* (2013.01)

(58) Field of Classification Search
CPC .. B64C 3/56; B64C 3/38; B64C 3/546; B64U 30/12
See application file for complete search history.

(56) References Cited

U.S. PATENT DOCUMENTS 5,050,817 A * 9/1991 Miller ...................... B60F 5/02
                                                  244/50
6,619,584 B1 * 9/2003 Haynes .................... B60F 5/02
                                                  244/50
(Continued)

FOREIGN PATENT DOCUMENTS

JP          S5069799 A       6/1975

OTHER PUBLICATIONS

International Preliminary Report on Patentability dated Apr. 12, 2022, in corresponding International Application No. PCT/EP2020/074774.

(Continued)

*Primary Examiner* — Michael H Wang
(74) *Attorney, Agent, or Firm* — Hoffmann & Baron, LLP

(57) ABSTRACT

A folding wing system for an aircraft, comprises a support structure mountable on the aircraft, and a wing segmented into at least a first and a second segment. The support structure is connected to the first segment via a first hinged connection and the first segment is connected to the second segment via a second hinged connection such that the wing is foldable from a cruise position to a folded position. The support structure is connected to a strut via a third hinged connection. The second segment has a bearing supporting a distal end of the strut both slidably and pivotably. A first drive is configured to drive one of the first and third hinged connections, and a second drive is configured to drive one of the second hinged connection, the bearing, and the other one of the first and third hinged connections.

20 Claims, 4 Drawing Sheets

(56) References Cited

U.S. PATENT DOCUMENTS

| | | | |
|---|---|---|---|
| 7,938,358 B2* | 5/2011 | Dietrich | B60F 5/02 244/49 |
| 8,267,347 B2* | 9/2012 | Goldshteyn | B64C 37/00 244/49 |
| 10,787,256 B2* | 9/2020 | Goelet | A01G 15/00 |
| 2002/0060267 A1 | 5/2002 | Yavnai | |
| 2010/0019080 A1 | 1/2010 | Schweighart et al. | |
| 2010/0051742 A1* | 3/2010 | Schweighart | B64C 3/56 244/49 |
| 2010/0230532 A1 | 9/2010 | Dietrich et al. | |
| 2014/0014764 A1* | 1/2014 | Lundgren | B60F 5/02 244/2 |
| 2017/0029094 A1 | 2/2017 | Lynas et al. | |
| 2017/0283052 A1 | 10/2017 | Moshe | |

OTHER PUBLICATIONS

European Search Report corresponding to Application No. 19201846.3-1010, dated Feb. 17, 2020.

PCT International Search Report corresponding to International Application No. PCT/EP2020/074774, dated Sep. 23, 2020.

* cited by examiner

AIRCRAFT AND FOLDING WING SYSTEM

CROSS-REFERENCE TO RELATED APPLICATIONS

This application is a National Phase application of International Application No. PCT/EP2020/074774 filed Sep. 4, 2020 which claims priority to the European Patent Application No. 19 201 846.3 filed Oct. 8, 2019, the disclosures of which are incorporated herein by reference.

TECHNICAL FIELD

The present disclosed subject matter relates to a folding wing system for an aircraft. The disclosed subject matter further relates to an aircraft equipped with two such folding wing systems.

BACKGROUND

Conventional folding wing systems, e.g., described in WO 2012/012752 A9, US 2010/02305332 A1, U.S. Pat. No. 6,619,584 B1, or in CN 103129735 B, are designed for folding the wings of the aircraft after the aircraft has landed safely, particularly to reduce the required taxi and/or parking space or for running the aircraft as a road vehicle. For this purpose, the conventional folding wing systems are designed to be robust during flight and to have a mechanism for folding that is as lightweight as possible. This is achieved, e.g., according to US 2010/0051742 A1, by a cable actuation for folding an outer wing section and an inner wing section of the folding wing such that the two wing sections move in concert. While this allows for a lightweight construction the wing sections cannot be moved individually and the stability of the folded wing is rather low.

It is an object of the present disclosed subject matter to provide a folding wing system which is flexible in operation, safe, and robust in use and still allows for a lightweight construction of the wings.

In a first aspect of the disclosed subject matter, this object is achieved with a folding wing system for an aircraft, comprising:
  a support structure mountable on the aircraft and
  a wing segmented into at least a first and a second segment,
  wherein the support structure is connected to a proximal end of the first segment via a first hinged connection and wherein a distal end of the first segment is connected to a proximal end of the second segment via a second hinged connection such that the wing is foldable from a cruise position to a folded position by pivoting the first segment up and the second segment down,
  which folding wing system further comprises:
  a strut, wherein the support structure is connected to a proximal end of the strut via a third hinged connection and wherein said second segment has a bearing supporting a distal end of the strut both slidably along a longitudinal direction running from the proximal end to a distal end of the second segment and pivotably about an axis transverse to said longitudinal direction,
  a first drive configured to drive one of the first and third hinged connections, and
  a second drive configured to drive one of the second hinged connection, the bearing, and the other one of the first and third hinged connections.

The strut connecting the support structure and the second segment ensures robustness of the folding wing system in any position throughout the whole folding process. The strut is safely supported on the support structure and guided in the bearing of the second segment.

In particular, such a folding wing system facilitates a design where the distal end of the second segment in the folded position of the wing can support the aircraft on the ground. The forces and torques arising in this position can be absorbed by the first and second segments in cooperation with the strut. Moreover, the strut provides additional rigidity and robustness to the wing when the aircraft is in flight. Hence, the strut facilitates a robust wing structure for an aircraft and still allows for a lightweight construction of the wing segments and the folding wing system as such.

Additionally, the two drives provide a high flexibility by allowing to control the first and second segments largely independently from one another such that, e.g., the distance between the distal end of the second segment and/or the rotation of the first and second wing segments with respect to the support structure can be chosen freely to a large extent. This allows to control the trajectory of the distal end of the second segment and thus the distance of the contact points on the ground. The folding wing system is, therefore, particularly suitable for vertical take-off and landing (VTOL) aircrafts.

In a further embodiment the wing comprises a third segment, wherein a proximal end of the third segment is connected to the distal end of the second segment via a fourth hinged connection, and wherein the wing is foldable from the cruise position to the folded position by pivoting the first segment up, the second segment down and the third segment up. This additional third wing segment increases the wing surface and the aspect ratio of the wing, thus reducing induced drag and therefore increasing efficiency. The second benefit is that the increased surface allows to reduce the stall speed and therefore to transition to horizontal flight at a lower forward speed. In other words, at a given wing span, the wing of three segments folds smaller than a wing of two segments. Furthermore, the third segment provides an option for mounting, e.g., a propulsion unit on its distal end, which does not interfere with the folding process and is distanced from the ground when the third segment is folded upwards, away from the ground.

For a safe and solid support on the ground, when the aircraft is landing or landed, the distal end of the second segment advantageously has a landing foot which is accommodated in the wing in the cruise position and exposed in the folded position. Due to the accommodation, the landing foot does not induce additional drag or negatively affect the air flow about the wing during cruise flight. In the embodiments of the wing with a third segment, the landing foot may, e.g., be accommodated therein when the wing is in its cruise position.

To reduce the impact on the aircraft during landing and to damp vibration when on the ground, the landing foot may include a shock absorber, e.g. an oleostrut.

In another favourable embodiment of the folding wing system, the first and second drives are located in the support structure. The benefit thereof is twofold: Firstly, the shift of mass towards the support structure reduces the mass of the wing segments and/or the strut and, hence, increases the maneuverability about the aircraft's roll axis. Secondly, folding and unfolding of the wing is simplified as the required driving of the hinges and/or the bearing is eased by the reduced mass of the elements to be driven.

The first and second drives may be of any type known in the art, e.g., comprising an electric motor, wherein the motor's stator constitutes one member of the hinged connection and the motor's rotor constitutes the other member of the hinged connection. In an advantageous embodiment, the first segment has a lever and one of the first and second drives is a linear drive, e.g. a lockable linear drive, which is supported on the support structure and coupled to the lever. In an alternative or additional embodiment the strut has an arm and the other one of the first and second drives is a linear drive, e.g. a lockable linear drive, which is supported on the support structure and coupled to the arm. Thereby, a simple and efficient driving of the first and/or the third hinged connection is achieved. The optional locking of the linear drives enhances safety and hinders unintended folding or unfolding. Moreover, the torque applicable to the first segment and/or to the strut can easily be customised by the respective lengths of the lever or arm. Also the angles between the lever and the first segment and/or between the arm and the strut as well as the support of the respective linear drive on the support structure may be customised to fulfil torque requirements.

The axes of the first and third hinged connections may be mutually distanced, however, in a favourable embodiment the first and third hinged connections share a common hinge axis. In this case the respective proximal ends of both the first segment and the strut are pivoted on the common hinge axis. Such an arrangement reduces the required mounting space in the support structure and the complexity thereof.

In a further beneficial embodiment, the support structure comprises two parallel, mutually spaced supporting plates mounting a shaft therebetween which forms the hinge axis of at least one of the first and third hinged connections. This design of the support structure allows for a particularly robust and simple support structure and an easy and durable mounting of the support structure on the aircraft via the supporting plates.

Since the fuselage of a typical aircraft has a substantially circular cross-section, it is advantageous when each supporting plate is substantially C-shaped. This, on the one hand, makes use of the available fuselage space, and, on the other hand, allows to easily connect two mirrored folding wing systems at the ends of their C or integrally form a plate consisting of two mirrored C-shaped plates, thus increasing the rigidity of the mounting on the aircraft.

In a favourable embodiment the wing has a channel in which the strut is accommodated in the cruise position of the wing. Thereby, an aerodynamic accommodation of the strut is achieved such that the drag of the aircraft during cruise is mitigated. The strut is not limited to a specific form. For being accommodated at least partially in the channel, the strut may be, e.g., angled or bent. However, when the first and third hinged connections share a common hinge axis and the strut is simply straight, it can be completely accommodated in the channel.

The bearing supports the distal end of the strut and provides for a combined slidable, i.e., linear, and pivotable movement of the distal end of the strut with respect to the second segment. In a further embodiment, the bearing comprises a groove on the second segment running in said longitudinal direction and, sliding in the groove, a base for supporting the distal end of the strut. This arrangement results in a simple, safe and easily maintainable bearing. In another embodiment, the base is releasably lockable in the groove. Thereby, the base and thus the distal end of the strut can be releasably locked in a predetermined or even in any position along the second segment, e.g., in the cruise position of the wing to prevent unintended folding and/or in the folded position to prevent unintended sliding.

To reduce the impact on the aircraft during landing and to damp vibration when on the ground, the strut may be a shock absorber, e.g. an oleostrut.

In a second aspect the disclosed subject matter creates an aircraft having a fuselage and two folding wing systems of the aforementioned type, each of which folding wing systems is mounted on the fuselage. In a further embodiment of the aircraft, the support structure of each folding wing system is mounted on the fuselage rotatably about a roll axis of the aircraft. The wings of such an aircraft can be oriented vertically, such that the aircraft could land on a vertical wall, e.g., a building, if the distal end of the second segment can be supported or affixed thereon. In a particularly advantageous aircraft, the wing of one of said folding wing systems is foldable independently of the wing of the other one of said folding wing systems. This allows to level the fuselage with respect to the folded wings and thus to keep the fuselage upright even when landing in uneven terrains, e.g., in mountains. Relating to further embodiments of the aircraft and the advantages thereof, it is referred to the above statements on the folding wing system.

BRIEF DESCRIPTION OF THE DRAWINGS

The disclosed subject matter shall now be explained in more detail below on the basis of an exemplary embodiment thereof with reference to the accompanying drawings, in which.

DETAILED DESCRIPTION

Figure 1A:
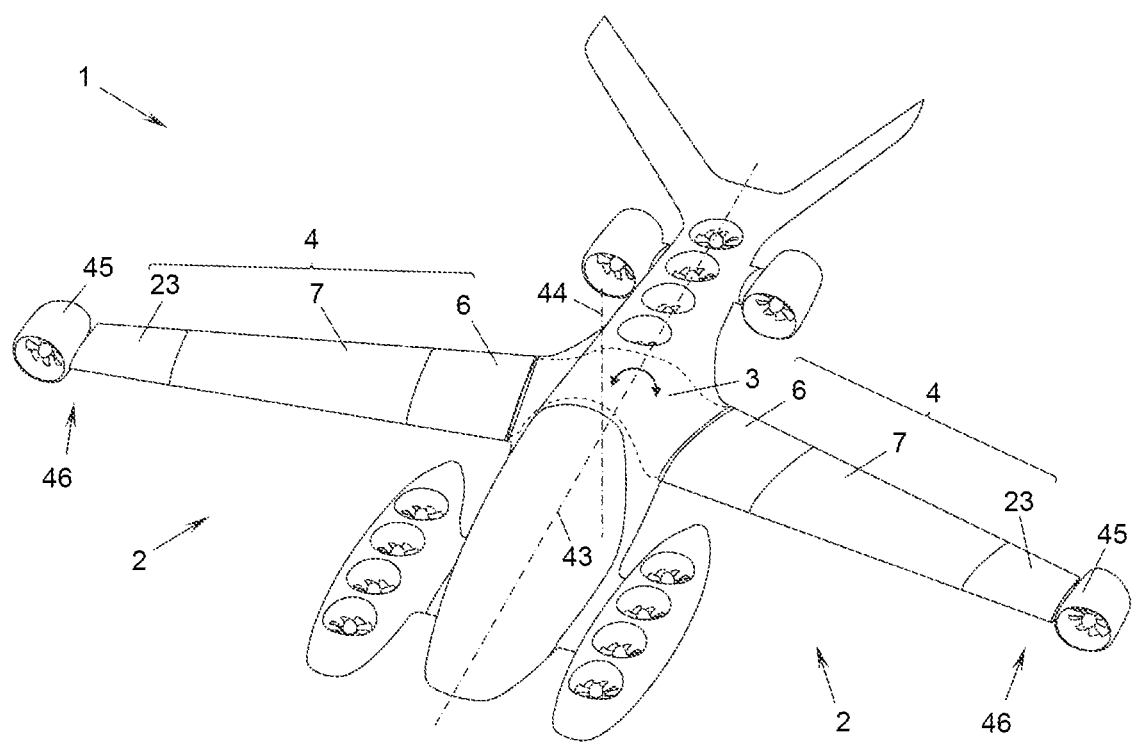
FIGS. 1a and 1b show an aircraft mounting two folding wing systems according to the disclosed subject matter in a cruise position (FIG. 1a) and in a folded position (FIG. 1b) of the wings, each in a perspective view from above.
Figure 1B:
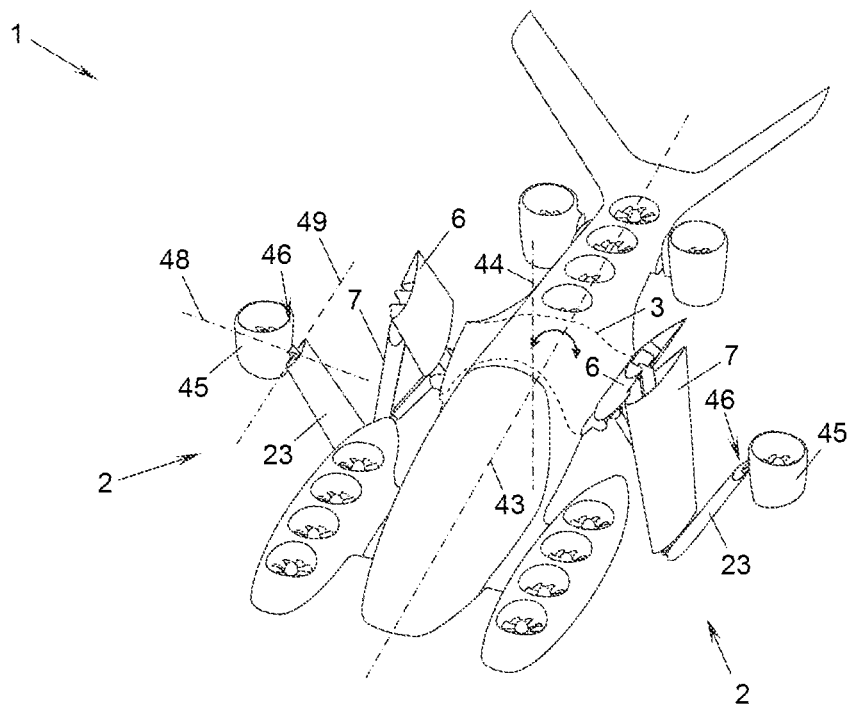

An aircraft 1 shown in FIGS. 1a and 1b has two folding wing systems 2 mounted on and extending from the aircraft's fuselage 3. Each folding wing system 2 has a wing 4 that is foldable from a cruise position (FIG. 1a) to a folded position (FIG. 1b) and back.

Details and variants of the folding wing system 2 shall now be explained on the basis of FIGS. 1 to 4.

The folding wing system 2 comprises a support structure 5 which is mountable on the fuselage 3 and supports the wing 4. The wing 4 is segmented into at least a first segment 6 and a second segment 7. The support structure 5 is connected to a proximal end 8, i.e., proximal to the support structure 5, of the first segment 6 via a first hinged connection 9. The first segment 5 is connected at its distal end 10, i.e., distal to the support structure 5 and opposite to the proximal end 8, to a proximal end 11 of the second segment 7 via a second hinged connection 12.

The folding wing system 2 further comprises a strut 13, to a proximal end 14 of which, i.e., proximal to the support structure 5, the support structure 5 is connected via a third hinged connection 15. A distal end 16 of the strut 13 is supported by a bearing 17 of the second wing segment 7 in a manner both slidable along a longitudinal direction 18 and pivotable about an axis 19 (FIG. 3) which is transverse to the longitudinal direction 18. The longitudinal direction 18 runs from the proximal end 11 to the distal end 20 of the second segment 7.

For driving a transition between the cruise position (FIG. 1a) and the folded position (FIG. 1b), i.e., for folding and unfolding the wing 4, the folding wing system 2 has a first drive 21 and a second drive 22. The first drive 21 drives either the first or the third hinged connection 9, 15. The second drive 22 drives either the second hinged connection 12, the bearing 17, or that one of the first and third hinged connection 9, 15 which is not driven by the first drive 21. Further drives may optionally be deployed.

For folding the wing 4 the two drives, i.e., the first and second drives 21, 22, pivot the first segment 6 up and the second segment 7 down. For this purpose, the two drives 21, 22 may work simultaneously or with a respective time shift or at different speeds. In this way, the trajectory of the distal end 20 of the second segment 7 can be controlled in a completely arbitrary manner. As shown in FIG. 1b, the wing 4 is not necessarily fully collapsed in the folded position. For unfolding the wing 4 this pivoting by the two drives 21, 22 is reversed. Herein, "up" and "down" relate to a general orientation of the folding wing system 2, i.e., the folding wing system 2 being mounted on the aircraft 1 and the aircraft 1 being in a horizontal position.

In the embodiment shown in FIGS. 1 to 4, the wing 4 comprises an optional third segment 23. In this case, a proximal end 24 of the third segment 23, i.e., proximal to the support structure 5, is connected to the distal end 20 of the second segment 7 via a fourth hinged connection 25 such that the wing 4 is folded by pivoting the first segment 6 up, the second segment 7 down and the third segment 23 up, thus forming a zig-zag pattern. The fourth hinged connection 25 may be pivoted by a separate drive, a cable actuation, a lever mechanism, or the like, as known in the art.

Figure 2:
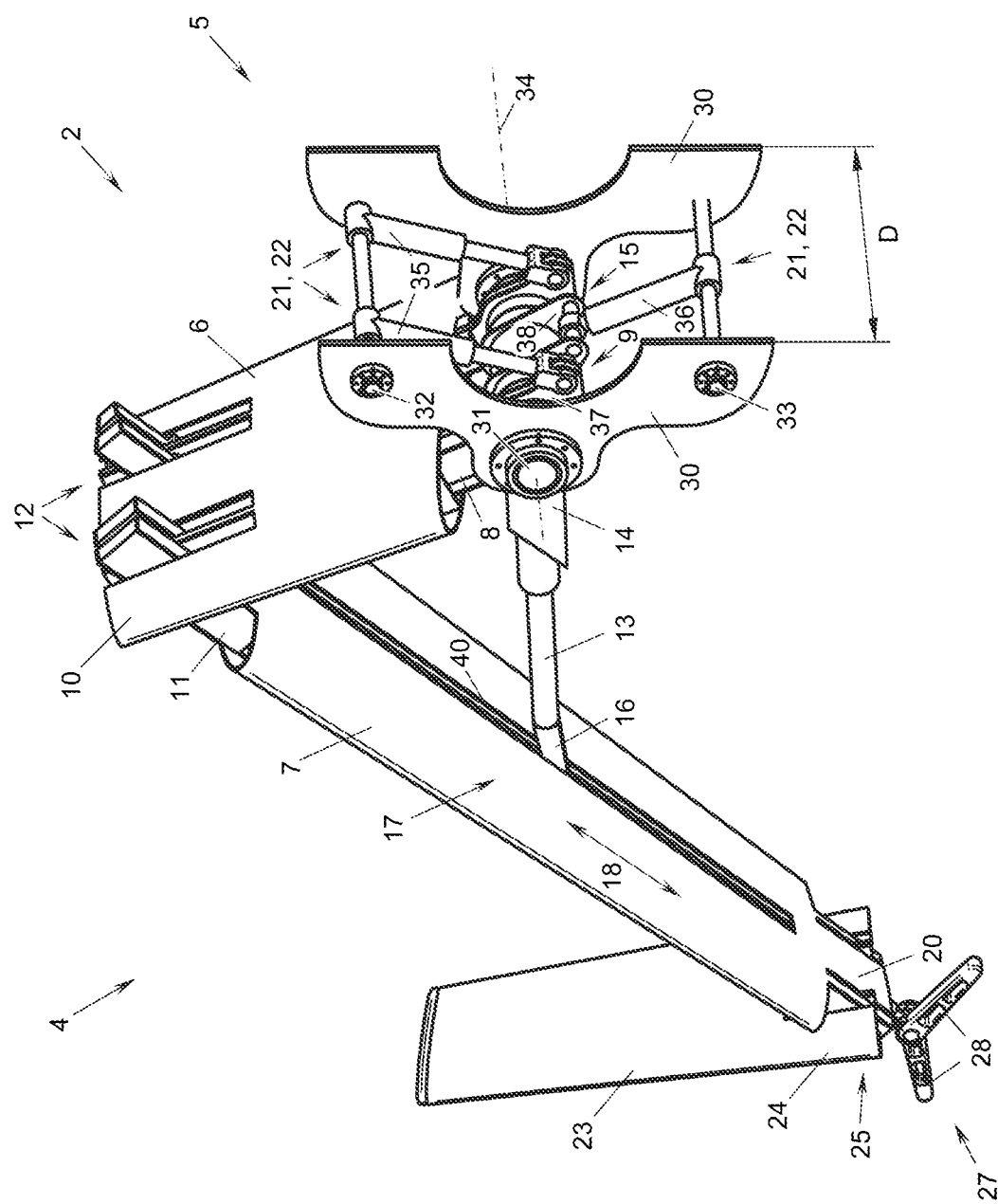
FIG. 2 shows one of the folding wing systems of FIGS. 1a and 1b in its folded position in a perspective side view.
Figure 3:
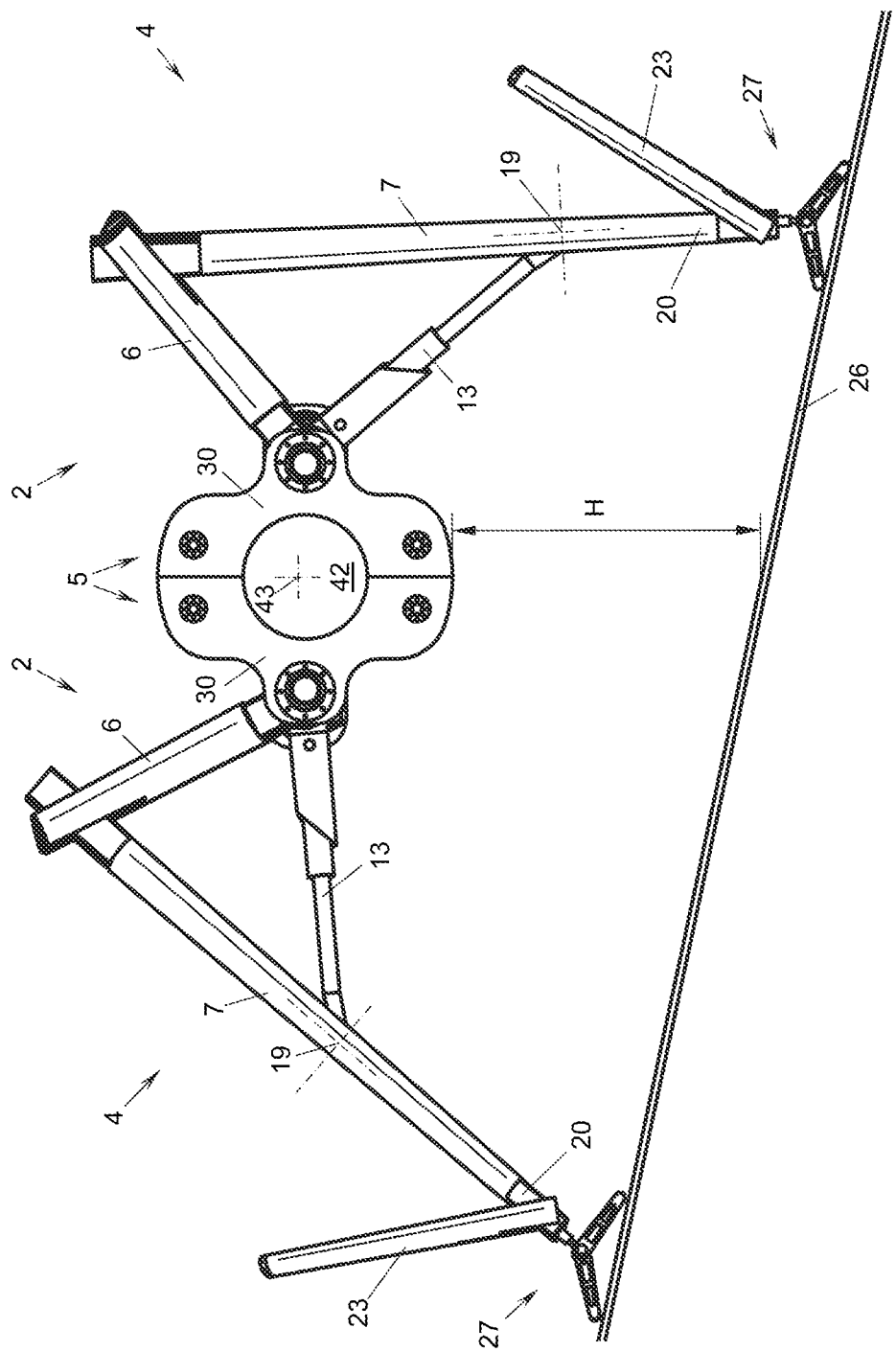
FIG. 3 shows the folding wing systems of FIGS. 1a and 1b in a front view without the aircraft.
Figure 4:
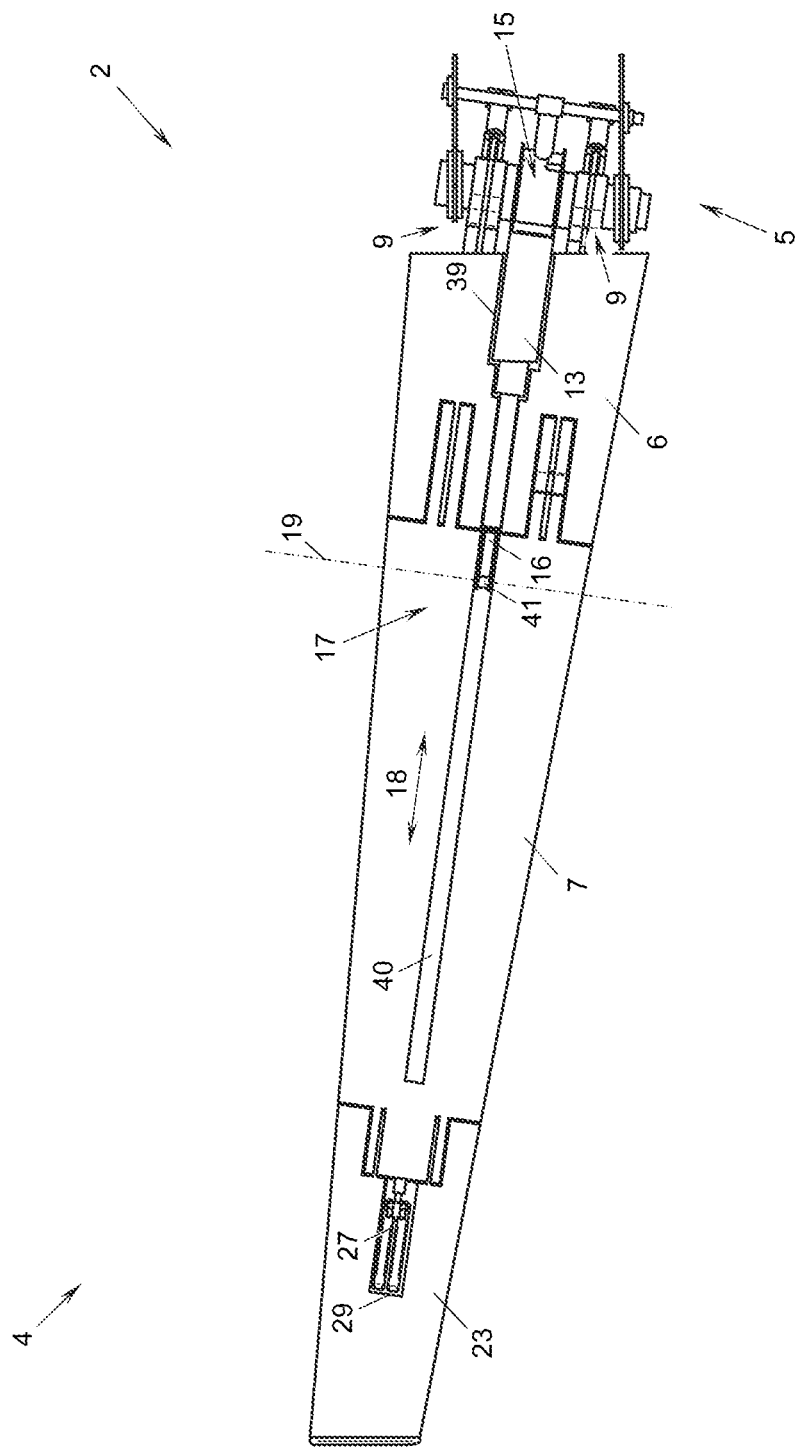
FIG. 4 shows the folding wing system of FIG. 2 in its cruise position in a bottom view.

As shown in FIGS. 2 and 3, the distal end 20 of the second segment 7 is generally the lowest part of the folding wing system 2 in the folded position of the wing 4. Hence, when the aircraft 1 is on the ground 26 the distal end 20 of the second segment 7 will be in contact with the ground 26. For supporting the distal end 20 of the second segment 7 on the ground 26, said distal end 20 has an optional landing foot 27. The landing foot 27 may be or comprise, e.g., a skid, a wheel or the like as known in the art. In the shown embodiment, the landing foot 27 is a spreadable bracket 28 which is spread on the ground 26 and collapsed otherwise (FIG. 4). Moreover, the landing foot 27 is exposed in the folded position of the wing 4, whereas it is optionally accommodated in the wing 4, e.g., in a recess 29 of the third segment 23, in the cruise position of the wing 4 (FIG. 4). Optionally, the landing foot 27 may have a shock absorber, e.g., an oleostrut for cushioning impacts.

The support structure 5 may be of any type known in the art, e.g., a frame or rack structure. In the embodiment shown in FIGS. 2 to 4, the support structure 5 comprises two supporting plates 30 that are parallel to each other and mutually spaced at a distance D. Between the two supporting plates 30, one or more shafts 31 or rods 32, 33 are mounted which connect the supporting plates 30. One of said shafts 31 or rods 32, 33, here: the shaft 31, optionally forms a hinge axis 34 of the first and/or the third hinged connection 9, 15 as will be explained in greater detail below.

In the embodiment shown in FIG. 2, both the first and the second drive 21, 22 are located in the support structure 5, i.e., the drives 21, 22 do not protrude from the support structure 5. In this example, both the first hinged connection 9 and the third hinged connection 15 are each driven by a respective linear drive 35, 36, i.e., each of the first and the second drive 21, 22 is a linear drive 35, 36. For example, one linear drive 35 is supported on the support structure 5, (here: on a first rod 32) and is coupled to the first segment 6. For this coupling, the first segment 6 has a lever 37 to which the linear drive 35 is coupled. The lever 37 generally protrudes from the first segment 6 but may alternatively coincide with the first segment 6 such that the linear drive 35 is coupled to the first segment 6 at a (lever) distance from the hinge axis 34.

Similarly, the strut 13 has an arm 38 optionally protruding from the strut 13 and the other linear drive 36 is supported on the support structure 5 (here: on a second rod 33) and coupled to the arm 38.

Each of the linear drives 35, 36 could, e.g., be one or more spindle drives, hydraulic cylinders, etc. It goes without saying that the first and/or the second drive 21, 22 could alternatively be another drive known in the art, e.g., an electric motor, the stator of which constitutes one member of the respective hinged connection 9, 15 and the rotor of which constitutes the other member of the hinged connection 9, 15. All the abovementioned variants of first and/or second drives 21, 22 could optionally be lockable in at least one position.

The first and third hinged connections 9, 15 may be spaced from each other on the support structure 5 such that they have different hinge axes. However, as shown in FIG. 2, the first and third hinged connections 9, 15 share the common hinge axis 34 which is formed by the shaft 31 in this example.

As shown in FIG. 4, the wing 4 may have a channel 39 in which the strut 13 is accommodated in the cruise position of the wing 4 when the strut 13 is straight and the first and third hinged connections 9, 15 share the hinge axis 34. When the first and third hinge axis are distanced from each other and/or the strut 13 has a different form, e.g., is bent or angled, the strut 13 may be partially accommodatable in the channel 39 of the wing 4 in its cruise position.

In the optional embodiment shown in FIG. 4, the bearing 17 of the second segment 7 comprises a groove 40 on the second segment 7 running in the longitudinal direction 18 and, sliding in the groove 40, a base 41. The base 41 supports the distal end 16 of the strut 13. To this end, the base 41 may, for example, be a pin (not visible) directed along the transverse axis 19 and passing through an opening in the distal end 16 of the strut 13; the pin, i.e., the base 41 in this case, is both slidable and pivotable in the groove 40 which may have a T-shaped cross-section for this purpose. Alternatively, the base 41 is merely slidable in the groove 40 and pivotably supports the distal end 16 of the strut 13. Moreover, the base 41 may optionally be driven in the groove 40, e.g., be a spindle nut to a driven threaded spindle inside the groove 40.

In an optional variant, the base 41 is releasably lockable in the groove 40, e.g., in the cruise position to prohibit unintended folding of the wing 4 or in any folded position to achieve a robust landing support. Moreover, the strut 13 is optionally a shock absorber, e.g., an oleostrut for cushioning possible impacts on the wing 4 when folded.

As shown in FIGS. 2 and 3, each supporting plate 30 may be substantially C-shaped such that two mirrored folding wing systems 2 easily fit into the typically circular cross-section of the fuselage 3 and still leave a central window 42 inside the fuselage 3 of the aircraft 1. Optionally, two mirrored C-shaped supporting plates 30 may be formed integrally as a single circular or ring-shaped plate.

In the variant of the aircraft 1 equipped with two folding wing systems 2 (FIGS. 1*a*, 1*b* and 3), the support structure 5 of each folding wing system 2 can be mounted on the fuselage 3 rotatably about a roll axis 43 of the fuselage. For this purpose, the supporting plates 30 could be mounted on a shaft passing through the central window 42. The wings 4 could be rotated in a vertical position parallel to a yaw axis 44 such that the aircraft 1 could land on a vertical wall, e.g., on a building, if the distal end 20 of the second segment 7 can be supported or affixed thereon.

Optionally, the wing 4 of each folding wing system 2 is foldable independently of the wing 4 of the other folding wing system 2. In this variant, the combined pivoting and folding of each wing 4 allows to level the fuselage 3 of the landed aircraft 1, e.g., when the ground 26 is uneven or inclined. In addition, said independent folding allows to adjust a height H of the fuselage 3 above ground 26. Moreover, the distal end 20 of the second segment 7 of one of the wings 4 could even rest against a substantially vertical wall.

As known in the art, the fuselage 3 optionally comprises a third landing foot (not shown) in addition to the two landing feet 27, e.g., a landing foot below the nose or tail of the aircraft 1.

As shown in FIGS. 1*a* and 1*b* the aircraft 1 is optionally a vertical take-off and landing (VTOL) aircraft 1. To this end, the third segment 23 of the wing 4 may comprise a propulsion unit 45, e.g., on a wing tip 46. With the third segment 23 folding up, the propulsion unit 45 is distanced from the ground 26 (FIG. 3) and does not hinder the folding procedure.

Optionally, the propulsion unit 45 may be tiltable about an axis 48 to produce thrust parallel to a yaw axis 44 or, after tilting, to the roll axis 43 of the aircraft 1. In the folded configuration of FIG. 1*b* the propulsion unit 45 mounted at the wing tip 46 would follow the pivoting movement of the tip segment 23. To still enable a constant thrust direction, e.g. parallel to the yaw axis 44 (FIG. 1*b*), during this folding movement, the propulsion unit may be further articulated on the respective wing tip 46 about a further axis 49 parallel to the roll axis 43 at the wing tip 46.

The disclosed subject matter is not restricted to the specific embodiments described above but encompasses all variants, modifications and combinations thereof that fall within the scope of the appended claims.

What is claimed is:

1. A folding wing system for an aircraft, comprising:
   a support structure mountable on the aircraft; and
   a wing segmented into at least a first and a second segment;
   wherein the support structure is connected to a proximal end of the first segment via a first hinged connection and a distal end of the first segment is connected to a proximal end of the second segment via a second hinged connection such that the wing is foldable from a cruise position to a folded position by pivoting the first segment up and the second segment down;
   further comprising:
   a strut, wherein the support structure is connected to a proximal end of the strut via a third hinged connection and wherein said second segment has a bearing supporting a distal end of the strut both slidably along a longitudinal direction running from the proximal end to a distal end of the second segment and pivotably about an axis transverse to said longitudinal direction;
   a first drive configured to drive one of the first and third hinged connections and
   a second drive configured to drive one of the second hinged connection, the bearing, and the other one of the first and third hinged connections.

2. The folding wing system according to claim 1, wherein the wing comprises a third segment, wherein a proximal end of the third segment is connected to the distal end of the second segment via a fourth hinged connection, and wherein the wing is foldable from the cruise position to the folded position by pivoting the first segment up, the second segment down and the third segment up.

3. The folding wing system according to claim 2, wherein the distal end of the second segment has a landing foot which is accommodated in the wing in the cruise position and exposed in the folded position.

4. The folding wing system according to claim 1, wherein the distal end of the second segment has a landing foot which is accommodated in the wing in the cruise position and exposed in the folded position.

5. The folding wing system according to claim 4, wherein the landing foot includes a shock absorber.

6. The folding wing system according to claim 4, wherein the landing foot includes an oleostrut.

7. The folding wing system according to claim 1, wherein the first and second drives are located in the support structure.

8. The folding wing system according to claim 1, wherein the first segment has a lever which protrudes from or coincides with the first segment, and wherein one of the first and second drives is a linear drive, which is supported on the support structure and coupled to the lever at a distance from the hinge axis of the first hinged connection.

9. The folding wing system according to claim 1, wherein the strut has an arm which protrudes from or coincides with the strut, and wherein the other one of the first and second drives is a linear drive, which is supported on the support structure and coupled to the arm at a distance from the hinge axis of the third hinged connection.

10. The folding wing system according to claim 1, wherein the first and third hinged connections share a common hinge axis.

11. The folding wing system according to claim 1, wherein the support structure comprises two parallel, mutually spaced supporting plates mounting a shaft therebetween which forms the hinge axis of at least one of the first and third hinged connections.

12. The folding wing system according to claim 1, wherein the wing has a channel in which the strut is accommodated in the cruise position of the wing.

13. The folding wing system according to claim 1, wherein the bearing comprises a groove on the second segment running in said longitudinal direction and, sliding in the groove, a base for supporting the distal end of the strut.

14. The folding wing system according to claim 13, wherein the base is releasably lockable in the groove.

15. The folding wing system according to claim 1, wherein the strut is a shock absorber.

16. An aircraft having a fuselage and two folding wing systems according to claim 1, each of which folding wing systems is mounted on the fuselage.

17. The aircraft according to claim 16, wherein the support structure of each of said two folding wing systems is mounted on the fuselage rotatably about a roll axis of the fuselage.

18. The aircraft according to claim 17, wherein the wing of one of said two folding wing systems is foldable independently of the wing of the other one of said two folding wing systems.

19. The aircraft according to claim 16, wherein the wing of one of said two folding wing systems is foldable independently of the wing of the other one of said two folding wing systems.

20. The folding wing system according to claim 1, wherein the strut is an oleostrut.

* * * * *